US010261296B1

(12) United States Patent
Mitchell

(10) Patent No.: US 10,261,296 B1
(45) Date of Patent: Apr. 16, 2019

(54) TELECENTRIC REFLECTIVE IMAGER

(71) Applicant: Thomas A. Mitchell, Nazareth, PA (US)

(72) Inventor: Thomas A. Mitchell, Nazareth, PA (US)

(73) Assignee: WAVEFRONT RESEARCH, INC., Northampton, PA (US)

( * ) Notice: Subject to any disclaimer, the term of this patent is extended or adjusted under 35 U.S.C. 154(b) by 0 days.

(21) Appl. No.: 14/839,302

(22) Filed: Aug. 28, 2015

Related U.S. Application Data

(60) Provisional application No. 62/043,616, filed on Aug. 29, 2014.

(51) Int. Cl.
  *G02B 13/22* (2006.01)
  *G02B 17/06* (2006.01)
  *G02B 27/00* (2006.01)

(52) U.S. Cl.
  CPC ......... *G02B 17/0647* (2013.01); *G02B 13/22* (2013.01); *G02B 27/0025* (2013.01)

(58) Field of Classification Search
  CPC .................. G02B 17/0647; G02B 17/0663
  See application file for complete search history.

(56) References Cited

U.S. PATENT DOCUMENTS

| | | | | |
|---|---|---|---|---|
| 4,812,028 A * | 3/1989 | Matsumoto | ........ | G02B 17/0828 359/366 |
| 5,515,207 A * | 5/1996 | Foo | .................... | G02B 17/0844 359/731 |
| 6,172,825 B1 * | 1/2001 | Takahashi | .......... | G02B 17/0657 359/364 |
| 6,213,610 B1 * | 4/2001 | Takahashi | .......... | G02B 17/0657 359/365 |
| 2004/0051857 A1 * | 3/2004 | Hudyma | ............ | G02B 17/0652 355/67 |
| 2006/0098273 A1 * | 5/2006 | Takahashi | .......... | G02B 17/0657 359/365 |
| 2006/0232867 A1 * | 10/2006 | Mann | .................... | G02B 13/143 359/858 |
| 2010/0231886 A1 * | 9/2010 | Mann | .................. | G03F 7/70233 355/67 |
| 2012/0287413 A1 * | 11/2012 | Komatsuda | ........ | G02B 17/0657 355/67 |

* cited by examiner

*Primary Examiner* — Darryl J Collins
(74) *Attorney, Agent, or Firm* — Burns & Levinson LLP; Orlando Lopez

(57) ABSTRACT

A reflective imager design that is telecentric in image space, or equivalently telecentric at an image plane, or equivalently having an exit pupil located substantially at infinity, while also having an external entrance pupil and a high throughput or fast optical speed is described.

12 Claims, 2 Drawing Sheets

TELECENTRIC REFLECTIVE IMAGER

CROSS REFERENCE TO RELATED APPLICATIONS

This application claims priority to and benefit of U.S. Provisional Application No. 62/043,616, entitled TELECENTRIC REFLECTIVE IMAGER, filed on Aug. 29, 2014, which is incorporated by reference herein in its entirety and for all purposes.

STATEMENT REGARDING FEDERALLY SPONSORED RESEARCH OR DEVELOPMENT

This invention was made with U.S. Government support from the U.S. Army under contract W15P7T-06-D-R401, subcontract R401-SC-20316-0252. The U.S. Government has certain rights in the invention.

BACKGROUND

These teachings relates to various embodiments of a reflective optical imager design that has an external entrance pupil and is telecentric in image space.

In many optical imaging systems, it is desirable to provide an external entrance pupil that is located outside the optical imaging system and between the source and the optical imaging system. Such an arrangement is difficult to achieve as a result of tradeoffs between the distance between the entrance pupil and the optical imaging system, or equivalently the entrance pupil relief, and the optical aberrations that result from the lack of symmetry about an optical stop that an external pupil introduces. Unlike other optical imaging systems that have a degree of symmetry about the optical stop, odd-order aberrations such as, but not limited to, optical distortion, coma, and lateral chromatic aberration cannot be substantially corrected in these types of optical imaging systems.

There is a need for optical designs, with at least one reflective element, that have an external entrance pupil and can correct for aberrations. There is also a need, with at least one reflective element, for optical designs that have an external entrance pupil and are telecentric in image space.

SUMMARY

The various embodiments of the present teachings provide a reflective imager design that is telecentric in image space, or equivalently telecentric at an image plane, or equivalently having an exit pupil located substantially at infinity, while also having an external entrance pupil and a high throughput or fast optical speed.

More specifically, the embodiments disclose and describe an imaging optical system made up of a first optical sub-system optically disposed to receive electromagnetic radiation from a source; an entrance pupil optically disposed substantially between the source and the first optical sub-system; a second optical sub-system optically disposed to receive electromagnetic radiation from the first optical sub-system; at least one of the first optical sub-system and second optical sub-system having at least one reflective optical element; the second optical sub-system being capable of substantially receiving electromagnetic radiation from the first optical sub-system; the second optical sub-system being substantially capable of imaging the substantially collimated electromagnetic radiation from the first optical sub-system onto a focus position; and the second optical sub-system being substantially telecentric in image space and having an exit pupil located substantially at infinity. It should be noted that the phrase used herein "the (first or second) optical system having at least one reflective optical element" refers to the optical system having at least one reflective optical element with optical power. (It should be noted that a reflective optical element with zero optical power can be used to fold any optical system.) Further, the embodiments also disclose and describe a method for detecting electromagnetic radiation, the method including the steps of: substantially receiving at an external entrance pupil electromagnetic radiation emanating from a source; reflecting the light; substantially imaging the external entrance pupil to a location substantially at infinity; substantially collimating the electromagnetic radiation received at the entrance pupil; substantially imaging the collimated electromagnetic radiation onto an image plane; and, substantially detecting the electromagnetic radiation.

For a better understanding of the present teachings, together with other and further objects thereof, reference is made to the accompanying drawings and detailed description and its scope will be pointed out in the appended claims.

DETAILED DESCRIPTION

Figure 1:
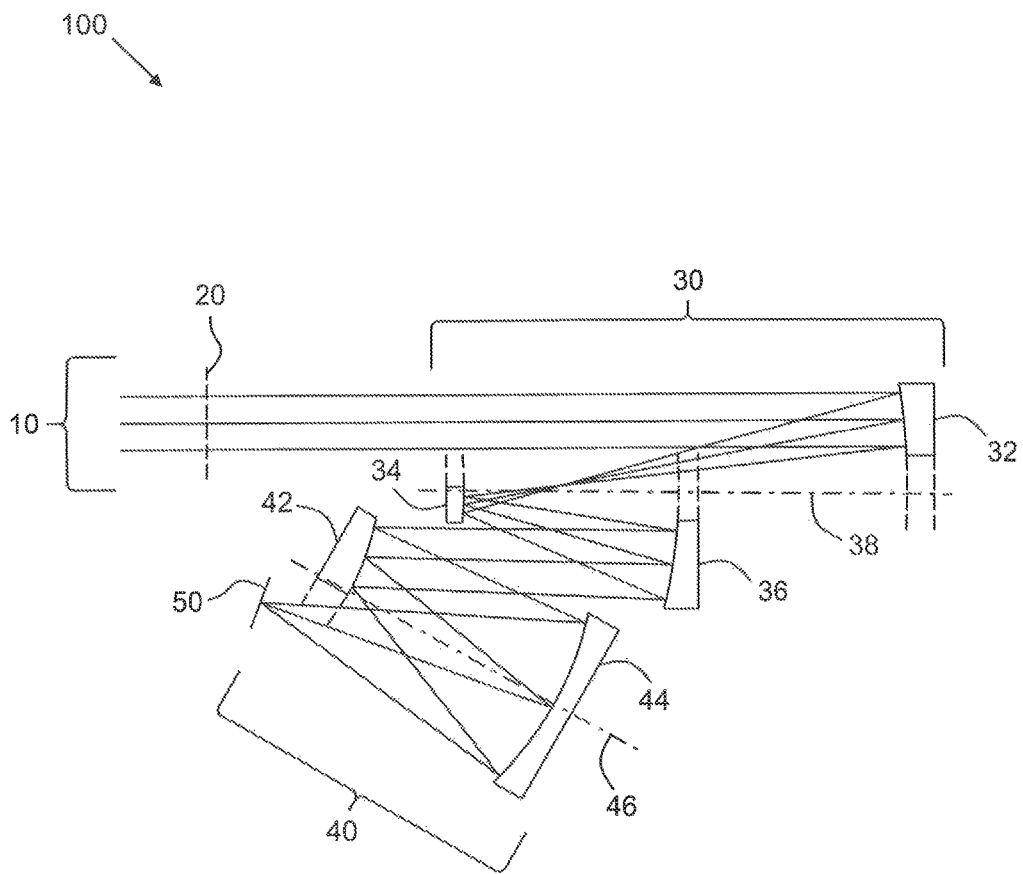
FIG. 1 is a schematic view of an embodiment of the present teachings, taken along its optical axes.

The following detailed description presents the currently contemplated modes of carrying out these teachings. The description is not to be taken in a limiting sense, but is made merely for the purpose of illustrating the general principles of these teachings, since the scope of these teachings is best defined by the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

These teachings relate to various embodiments of a novel reflective optical imager design that has an external entrance pupil, a high throughput and/or fast optical speed, and is telecentric in image space.

In some specialized optical imaging systems, it is desirable to provide an external entrance pupil location in front of the system. In some cases, the location of the entrance pupil can be significantly far in front of the optical system relative to the focal length of the system, with the distance between the entrance pupil and the first element of the optical system ranging from zero to many times the focal length, where all intermediate ranges are also within these teachings. In optical designs having an external entrance pupil, since an external entrance pupil is optically disposed between the source and the optical system, no symmetry can be exploited to correct the aberrations. For example, consider some applications of imaging sensors in which it is desirable to have a common fore-optic imaging system that is shared by two or more distinct imaging systems in order to provide co-registered imagery. An external entrance pupil can provide greater throughput coupling between the common fore-optics and an imaging sensor by providing significant pupil relief (a term well known in the art to represent the distance between a pupil and the optical system) such that it can be substantially co-located with the exit pupil of the common fore-optic imaging system.

In other specialized optical systems, it is also desirable for the system to be telecentric in image space. This telecentric design can be difficult to achieve as a result of tradeoffs between back focal distance (which directly impacts the size of the optical system in the plain orthogonal to the optical axis), size of the optical elements, and the optical aberrations that result from locating the exit pupil of the system at a near infinite distance from the system. For example, consider some applications of imaging sensors, like, but not limited to, hyperspectral systems, in which it is desirable for the imager component of the system to provide substantially telecentric imagery to a spectrometer component of the system in order to reduce vignetting and maximize throughput when coupling the output of the imager to a spectrometer system. This telecentric design can be difficult to achieve, particularly for reflective imagers, as a result of, but not limited to, tradeoffs in size, entrance pupil location, and degree of obscuration.

In still more specialized cases, it may be desirable for the system to have an external entrance pupil and also be telecentric in image space. These types of systems can include state of the art common aperture hyperspectral imaging sensors such as that described in the co-pending U.S. patent application Ser. No. 14/587,268, entitled COMPACT COMMON APERTURE IMAGER SYSTEM, filed on Dec. 31, 2014, which is incorporated by reference herein in its entirety and for all purposes). System designs of this type can be very difficult to achieve, particularly for reflective systems. The teachings disclosed here provides an optical imager that meets these desired capabilities. Reference is made to FIG. 1, which is a schematic view of an embodiment of an optical imaging system 100. Electromagnetic radiation, typically in the ultraviolet, visible, and/or infrared bands, hereinafter referred to generally as light or electromagnetic radiation, emitted or reflected by a given object, either real or virtual, hereinafter referred to generally as a source 10, located at the object plane of the source 10 is incident on the entrance pupil 20 of an imaging optical system 100, in this embodiment made up of, but not limited to, three reflective elements 32, 34, and 36 such as, but not limited to, mirrors, that, in this embodiment, share a common optical axis 38, which is capable of substantially receiving a portion of the light from the source 10. The light is then incident on a second portion 40 of the imaging optical system 100, in this embodiment made up of, but not limited to, two reflective elements 42 and 44 such as, but not limited to, mirrors, that in this embodiment share a common optical axis 46. The second portion 40 of the imaging optical system 100 is capable of substantially receiving the light from the first portion 30 of the imaging optical system 100 and then substantially focusing the light to a focus position 50.

Figure 2:
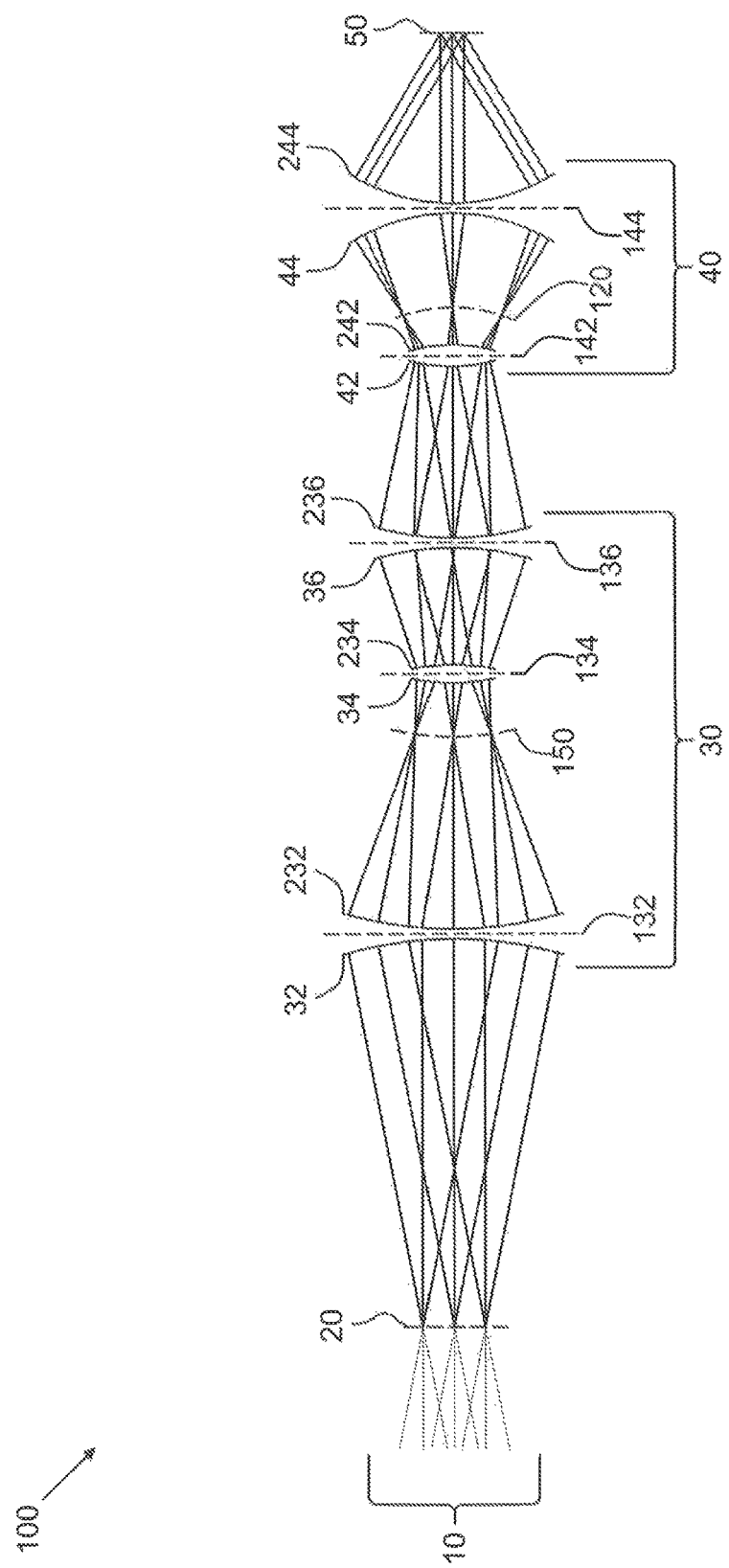
FIG. 2 is a schematic view of the embodiment of the present teachings illustrated in FIG. 1, in the plane orthogonal to that of FIG. 1.

Reference is now made to FIG. 2, which is a schematic view of the embodiment of the optical system 100, taken along the plane orthogonal to that illustrated in FIG. 1. Because illustrations of reflective imaging systems can be difficult to visualize due to the folded nature of such systems, for clarity, and to better illustrate the imaging properties of the embodiment of the optical system 100 in this plane, the imaging optical system 100 is shown unfolded in FIG. 2 at each of the reflective elements 32, 34, 36, 42, and 44 about respective planes 132, 134, 136, 142, and 144, where each plane is located just behind their respective reflective elements. Symmetric copies of the reflective elements 32, 34, 36, 42, and 44 are then illustrated as the reflective elements 232, 234, 236, 242, and 244, respectively, about their respective planes 132, 134, 136, 142, and 144. In this manner, for clarity, the optical system 100 is illustrated unfolded in a single plane.

Clearly shown in FIG. 2, light from a single or multiple field positions at the source 10 is incident on the entrance pupil 20 of an imaging optical system 100, in this embodiment made up of, but not limited to, three reflective elements 32, 34, and 36 such as, but not limited, to mirrors. The first portion 30 of the optical system 100 is capable of substantially receiving a portion of the light from the source 10. For clarity in illustration, light reflected by the reflective element 32 is shown unfolded as light reflected by the mirror image 232 (also reflective element 232) of the reflective element 32 about the plane 132. Likewise, light reflected by the reflective element 34 is shown unfolded as light reflected by the mirror image 234 (also reflective element 234) of the reflective element 34 about the plane 134 and light reflected by the reflective element 36 is shown unfolded as light reflected by the mirror image 236 (also reflective element 236) of the reflective element 36 about the plane 136. The light is then incident on a second portion 40 of the imaging optical system 100, in this embodiment made up of, but not limited to, two reflective elements 42 and 44 such as, but not limited, to mirrors, which are capable of substantially receiving the light from the first portion 30 of the imaging optical system 100 and substantially focusing the light to a focus position or image plane 50. For clarity in illustration, light reflected by the reflective element 42 is shown unfolded as light reflected by the mirror image 242 (also reflective element 242) of the reflective element 42 about the plane 142. Likewise, light reflected by the reflective element 44 is shown unfolded as light reflected by the mirror image 244 (also reflective element 244) of the reflective element 44 about the plane 144. In this embodiment, as shown in FIG. 2, the entrance pupil 20 is relayed by the first portion 30 of the imaging optical system 100 to an intermediate pupil 120. In the exemplary embodiment shown, the intermediate pupil 120 is located within, but not limited to, the second portion 40 of the imaging optical system 100, such that the intermediate pupil 120 is imaged substantially to infinity by the second portion 40 of the imaging optical system, making the imaging optical system substantially telecentric in image space. It should be noted that these teachings are not limited to the intermediate pupil 120 being located within the second portion 40 of the imaging optical system 100. In the embodiment shown in FIGS. 1 and 2, the source 10 is substantially imaged by the first portion 30 of the imaging optical system 100 to an intermediate image 150 located within, but not limited to, the first portion 30 of the imaging optical system 100. In this embodiment, the intermediate image location 150 is relayed by the second portion 40 of the imaging optical system to the focus position 50.

The unfolded system shown in FIG. 2 shows that the system of these teachings includes systems where the first optical subsystem 30 is totally refractive but having the same input and output as the first optical subsystem shown in FIG. 2 while the second optical subsystem has at least one reflective component (having nonzero optical power) and also includes systems where the second optical subsystem is totally refractive but having the same input and output as the second optical subsystem shown in FIG. 2 while the first optical subsystem has at least one reflective component (having nonzero optical power).

The optical system 100 provides a system and method for detecting electromagnetic radiation. For example, the method includes the steps of substantially receiving at an external entrance pupil electromagnetic radiation (light) emanating from a source 10; substantially imaging the external entrance pupil 20 to a location substantially at infinity; substantially collimating the electromagnetic radiation received at the entrance pupil 20; substantially imaging the collimated electromagnetic radiation onto at least one detecting element located substantially at focus (image plane) 50 (in the instance where a detecting element is located substantially at the image plane, 50 indicates the detecting element); and substantially detecting the electromagnetic radiation.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although exemplary embodiments are shown with a predetermined number of elements, it should be noted that these teachings are not limited to only those embodiments. For example, any number of optical elements, reflective or refractive, can be used in embodiments of these teachings. In addition and, due to the bi-directional nature of the propagation of light, it should also be realized that embodiments of these teachings can be utilized in the reverse direction, interchanging the terms "entrance" and "exit" with regard to the pupil locations and the terms "object" and "image" with regard to the system telecentricity.

Although these teachings have been described with respect to various embodiments, it should be realized these teachings are also capable of a wide variety of further and other embodiments within the spirit and scope of the appended claims.

The invention claimed is:

1. An imaging optical system comprising:
a first optical sub-system;
said first optical sub-system being optically disposed to receive light from a source;
an entrance pupil;
said entrance pupil being optically disposed between said source and said first optical sub-system; said light from said source, the source being located at an object plane, being substantially collimated at said entrance pupil;
an intermediate pupil;
said first optical sub-system being configured to image said entrance pupil to said intermediate pupil;
a second optical sub-system;
said second optical sub-system being configured to image said intermediate pupil substantially to infinity;
wherein at least one of said first optical sub-system and said second optical sub-system has at least one reflective element;
said second optical sub-system configured to receive light from said first optical sub-system;
said second optical sub-system being configured to focus said light onto an image plane, and;
said second optical sub-system being substantially telecentric at said image plane.

2. The optical imaging system of claim 1 wherein said first optical sub-system has at least one reflective element.

3. The optical imaging system of claim 2 wherein said second optical sub-system also has at least one reflective element.

4. The optical imaging system of claim 1 wherein said second optical sub-system has at least one reflective element.

5. The imaging optical system of claim 1 wherein said first optical sub-system is optically configured to collimate light from said source.

6. The imaging optical system of claim 5 wherein said first optical sub-system has at least one intermediate image plane located within the first optical sub-system.

7. The imaging optical system of claim 1 further comprising:
at least one detecting element;
said at least one detecting element being located at said image plane.

8. An imaging optical system comprising:
a first optical sub-system;
said first optical sub-system having an entrance pupil disposed to provide light to said first optical sub-system; said light from a source, the source being located at an object plane, being substantially collimated at said entrance pupil;
an intermediate pupil;
said first optical sub-system being configured to image said entrance pupil to said intermediate pupil;
a second optical sub-system;
said intermediate pupil being imaged substantially to infinity by said second optical sub-system;
said second optical sub-system configured to receive light from said first optical sub-system, wherein at least one of said first optical sub-system and said second optical sub-system has at least one reflective element;
said second optical sub-system being substantially telecentric at an image plane.

9. The optical imaging system of claim 8 wherein said first optical sub-system has at least one reflective element.

10. The optical imaging system of claim 9 wherein said second optical sub-system also has at least one reflective element.

11. The optical imaging system of claim 8 wherein said second optical sub-system has at least one reflective element.

12. A method for detecting light comprising:
receiving at an external entrance pupil, substantially collimated light emanating from a source, the source being located at an object plane;
reflecting the light;
imaging the external entrance pupil to an intermediate pupil;
imaging the intermediate pupil to a location substantially at infinity, thereby providing a telecentric condition at an image plane;
imaging the source onto an image plane, thereby providing imaged light; and
detecting the imaged light.

* * * * *